(12) United States Patent
Ahn et al.

(10) Patent No.: US 6,580,474 B1
(45) Date of Patent: Jun. 17, 2003

(54) LIQUID CRYSTAL DISPLAY DEVICE AND METHOD FOR FABRICATING THE SAME

(75) Inventors: Byung Chul Ahn, Kyongbuk (KR); Byung Ho Lim, Kyongbuk (KR); Soon Sung Yoo, Kyongbuk (KR); Yong Wan Kim, Kyongbuk (KR); Young Hun Ha, Kyongbuk (KR)

(73) Assignee: LG. Philips LCD Co., Ltd., Seoul (KR)

( * ) Notice: Subject to any disclaimer, the term of this patent is extended or adjusted under 35 U.S.C. 154(b) by 274 days.

(21) Appl. No.: 09/657,507

(22) Filed: Sep. 8, 2000

(30) Foreign Application Priority Data

Sep. 8, 1999 (KR) .............................................. 99-38017

(51) Int. Cl.[7] .......................... G02F 1/136; H01L 21/00
(52) U.S. Cl. ............................................. 349/43; 438/30
(58) Field of Search ............................ 438/30; 349/42, 349/43, 46

(56) References Cited

U.S. PATENT DOCUMENTS

| | | | | |
|---|---|---|---|---|
| 5,811,318 A | * | 9/1998 | Kweon | 257/59 |
| 5,818,551 A | * | 10/1998 | Park | 349/187 |
| 5,920,362 A | * | 7/1999 | Lee | 349/187 |
| 6,091,465 A | * | 7/2000 | Lyu | 349/43 |
| 6,300,988 B1 | * | 10/2001 | Ishihara et al. | 257/59 |
| 6,331,880 B1 | * | 12/2001 | Han | 257/72 |

FOREIGN PATENT DOCUMENTS

| | | |
|---|---|---|
| JP | 4-174822 | 6/1992 |
| KR | 97-59801 | 12/1997 |

* cited by examiner

*Primary Examiner*—Robert H. Kim
*Assistant Examiner*—Jeanne A. Di Grazio
(74) *Attorney, Agent, or Firm*—Birch, Stewart, Kolasch & Birch, LLP

(57) ABSTRACT

A liquid crystal display device and a method of fabricating the same are disclosed. The device, as disclosed, reduces the number of masks required for fabrication. Thus, cost is reduced and yield is increased. The device includes a plurality of gate lines, a plurality of data lines crossing the gate lines such that active regions are defined near the crossover points, thin film transistors are formed near the active regions, and a plurality of pixel electrodes are formed within regions defined by the adjacent gate and data lines. Also, pixel electrodes overlap gate lines and the two electrodes function as a storage capacitor. A fabrication method includes forming a gate line; forming a data line region, protection layers, and an active area where drain and source electrodes are spaced apart at a predetermined distance; forming a data line, a gate line protection layer, and a gate insulating layer; and forming pixel electrodes by depositing a transparent conductive material, such that each pixel electrode also overlaps a portion of a gate line.

21 Claims, 10 Drawing Sheets

LIQUID CRYSTAL DISPLAY DEVICE AND METHOD FOR FABRICATING THE SAME

This application claims the benefit of Korean Patent Application No. 1999-38017, filed on Sep. 8, 1999, which is hereby incorporated by reference.

BACKGROUND OF THE INVENTION

1. Field of the Invention

The present invention relates to a liquid crystal display (LCD) device, and more particularly, to a device and method for fabricating the LCD device having a thin film transistor (TFT).

2. Discussion of the Prior Art

Generally, an LCD device includes top and bottom glass substrates and a liquid crystal injected therebetween. On the bottom glass substrate, a plurality of gate lines extending in one direction and a plurality of data lines extending in a perpendicular direction are formed. In this matrix arrangement, a plurality of TFTs are disposed near the crossover points of the data and gate lines.

On the top glass substrate, red (R), green (G) and blue (B) color filter layers and a common electrode are disposed. Generally, a light shielding layer (black matrix) is formed on the top glass substrate and a pair of polarizers are disposed on the outer surfaces of the top and bottom glass substrates to selectively transmit light.

A conventional LCD device will be described in detail below with reference to FIG. 1, which is a plan view of a conventional LCD device.

As illustrated in FIG. 1, the conventional LCD device includes a plurality of gate lines 22 formed on a transparent substrate, a plurality of data lines 24 perpendicularly crossing the gate lines 22, a plurality of TFTs "S" formed near the crossover points of the gate and data lines 22 and 24, and a plurality of pixel electrodes 14 connected to the TFTs "S". The gate lines 22 are separated by intervals from each other and extend in one direction, whereas the data lines 24 are separated by intervals from each other and extend in a perpendicular direction to the gate lines 22. Each end portion of gate and data lines 22 and 24 has gate and data pads 21 and 23, respectively. A storage capacitor "Cst" is arranged on a predetermined portion of the gate line 22. Two adjacent gate lines 22 and two adjacent data lines 24 define the boundaries of a pixel region. In each pixel region, a TFT "S" and a pixel electrode 14 are disposed.

Each TFT includes a gate electrode 26, a source electrode 28 and a drain electrode 30. A gate insulating layer is formed between the gate and source electrodes 28 and 30 and between the gate and drain electrodes 26 and 30. The gate electrode 26 extends from the gate line 22 and the source electrode 28 extends from the data line 24. The drain electrode 30 connects the pixel electrode 14 through a contact hole 31.

The TFT transmits a signal of the data line 24 to the pixel electrode 14 in response to a signal of the gate line 22.

In the conventional LCD device having the above-described TFTs, if a signal voltage is applied to the gate electrode 26, the TFT is turned on so as to transmit a data voltage representing picture data to the pixel electrode 14 and the liquid crystal.

FIGS. 2A to 2E show fabrication process steps of an active matrix liquid crystal display device according to the conventional art.

First, a first metal layer is deposited on a substrate 1 by a sputtering process after a cleaning process in order to remove organic materials and alien substances from the substrate 1, thereby enhancing adhesion between the substrate 1 and the metal layer. FIG. 2A shows a step for forming a gate electrode 26 and a first capacitor electrode 22 by patterning the first metal layer using a first mask.

A low resistance metal such as aluminum is used to form the gate electrode 26 so as to reduce the RC delay. However, pure aluminum has weak resistance to most enchants and may result in line defects due to a formation of a hillock during a high temperature process. Thus, an aluminum alloy is used. And in some cases, a double layered gate is used wherein another metal layer covers the aluminum or aluminum alloy.

A gate insulating layer 50 is deposited on the whole surface of the substrate 1 covering the gate and capacitor electrodes 26 and 22. Then, a pure amorphous silicon (a-Si:H) layer 52 and a doped amorphous silicon (n$^+$a-Si:H) layer 54 are deposited sequentially on the gate insulating layer 50.

As shown in FIG. 2B, an active layer 55 and a semiconductor island 53 are formed by patterning the silicon layers 52 and 54 using a second mask. The doped amorphous silicon layer 54 (i.e. ohmic contact layer) reduces the contact resistance between the active layer 55 and an electrode which is formed later.

FIG. 2C shows a step for forming a data line 24, source and drain electrodes 28 and 30 by depositing a second metal layer. At the same time, a second capacitor electrode 58 is formed on the gate insulating layer 50, covering a portion of the first capacitor electrode 22.

Then, the ohmic contact layer between the source and drain electrodes 28 and 30 is etched using the source and drain electrodes 28 and 30 as a mask.

As depicted in FIG. 2D, an insulating layer is deposited on the entire surface of the substrate 1 covering the source and drain electrodes 28 and 30. The insulating layer is patterned using a fourth mask to form a protection film 56. The protection film 56 may be selected from inorganic materials such as SiN$_x$ and SiO$_2$ or organic materials such as a BCB (benzocyclobutene). In addition, a material having a high light transmittance, humidity resistance and durability is used to form the protection film 56 in order to protect the channel area of the TFT and major portions of a pixel region from possible exposure to humidity and scratches during later processing steps.

Further, a data pad contact hole 33 is formed on the data pad 23, and drain and capacitor contact holes 31 and 59 are formed on the drain electrode 30 and the second capacitor electrode 58, respectively.

FIG. 2E shows a step for forming a pixel electrode 14 by depositing a transparent conducting oxide (TCO) layer 15 and patterning it using a fifth mask. Indium tin oxide (ITO) is usually employed for the transparent conducting oxide layer. The pixel electrode 14 contacts the second capacitor electrode 58 through the capacitor contact hole 59 and the drain electrode 30 through the drain contact hole 31. Another portion of the transparent conducting oxide layer 15 is also formed contacting the data pad 23 through the data pad contact hole 33.

As described, the conventional art requires at least five masks in fabricating the TFT array panel of the LCD device, and each mask process requires many steps such as cleaning, depositing, baking and etching. Therefore, if the number of mask processes is reduced, even if only by one, then production would be increased and cost would be decreased.

SUMMARY OF THE INVENTION

Therefore it is an object of the present invention to provide a thin film transistor array panel of a liquid crystal display device and methods of forming the same that eliminates the problems of conventional methods.

A further object of the present invention is to fabricate the liquid crystal display device with a high yield and a reduced fabrication time. The present invention provides, in one embodiment, a method for fabricating a liquid crystal display array panel, comprising the steps of: forming a gate line by depositing a first metal layer on a substrate and patterning the first metal layer using a first mask; depositing an insulating layer, a pure amorphous silicon layer, a doped amorphous silicon layer and a second metal layer sequentially on the entire surface of the substrate and covering the gate line; forming a data line region, a gate line protection layer and an active area by patterning the second metal layer and the doped amorphous silicon layer using a second mask, the data line region having a source electrode and the gate line protection layer having a drain electrode spaced at a predetermined distance from the source electrode; depositing a protection layer on the entire surface of the substrate while covering the data line region, the gate line protection layer and the active area; forming a data line, a protection film and a gate insulating layer using a third mask; depositing a transparent conductive material on the entire surface of the substrate while covering the data line and the source and drain electrodes; and forming a pixel electrode and exposing a portion of the gate line using a fourth mask, the pixel electrode being connected with the drain electrode, the exposed portion extending from the active area.

The present invention provides, in another embodiment, a method for fabricating a liquid crystal display device, comprising steps of: forming a gate line by depositing a first metal layer on a substrate and patterning the first metal layer using a first mask; depositing an insulating layer, a pure amorphous silicon layer, a doped amorphous silicon layer and a second metal layer sequentially on the entire surface of the substrate and covering the gate line; forming an active area using a second mask by selectively patterning the second metal layer and the pure amorphous silicon layer, the second metal layer covering the entire surface of the substrate except for the active area; depositing a protection layer on the entire surface of the substrate while covering the data line region, the gate line protection layer and the active area; forming a data line, a protection film, a gate insulating layer, and source and drain electrodes by patterning the second metal layer, the pure amorphous metal layer, the doped amorphous silicon layer and the insulating layer using a third mask; depositing a transparent conductive material on the entire surface while covering the data line and the source and drain electrodes; and forming a pixel electrode and exposing a portion of the gate line using a fourth mask, the pixel electrode being connected with the drain electrode, the exposed portion extending from the active area.

The present invention provides, in a further embodiment, a method for fabricating a liquid crystal display device, comprising steps of: forming a gate line by depositing a first metal layer on a substrate and patterning the first metal layer using a first mask; depositing an insulating layer, a pure amorphous silicon layer, a doped amorphous silicon layer and a second metal layer sequentially on the entire surface of the substrate while covering the gate line; forming an active area and a data line region using a second mask by selectively patterning the second metal layer and the pure amorphous silicon layer, the second metal layer away from the data line region and covering the entire surface of the substrate excluding the active area and the data line; depositing a protection layer on the entire surface of the substrate and covering the data line region, the gate line protection layer and the active area; forming a data line, a protection film, a gate insulating layer, and source and drain electrodes using a third mask by patterning the second metal layer, the pure amorphous metal layer, the doped amorphous silicon layer and the insulating layer; depositing a transparent conductive material on the entire surface including the data line and the source and drain electrodes; and forming a pixel electrode and exposing a portion of the gate line using a fourth mask, the pixel electrode being connected with the drain electrode, the exposed portion extending from the active area.

The first metal layer can be anyone of Cr, Mo, and an aluminum-based metal. The present invention provides a method further comprising, a step of removing the exposed portion of the gate line. The transparent conductive material is Indium Zinc Oxide. In the third mask process is formed a contact hole to connect the drain electrode with the pixel electrode. A contacting area between the drain electrode and the pixel electrode is larger than a cross section area of the drain electrode. The active area has a "C" shape.

BRIEF DESCRIPTION OF THE DRAWINGS

These and other objects, features and advantages of the invention will become more readily apparent from a consideration of the following detailed description set forth with reference to the accompanying drawings, which specify and show preferred embodiments of the invention of which.

DETAILED DESCRIPTION OF THE PREFERRED EMBODIMENTS

Reference will now be made in detail to the preferred embodiments of the present invention, an example of which is illustrated in the accompanying drawings.

Figure 1:
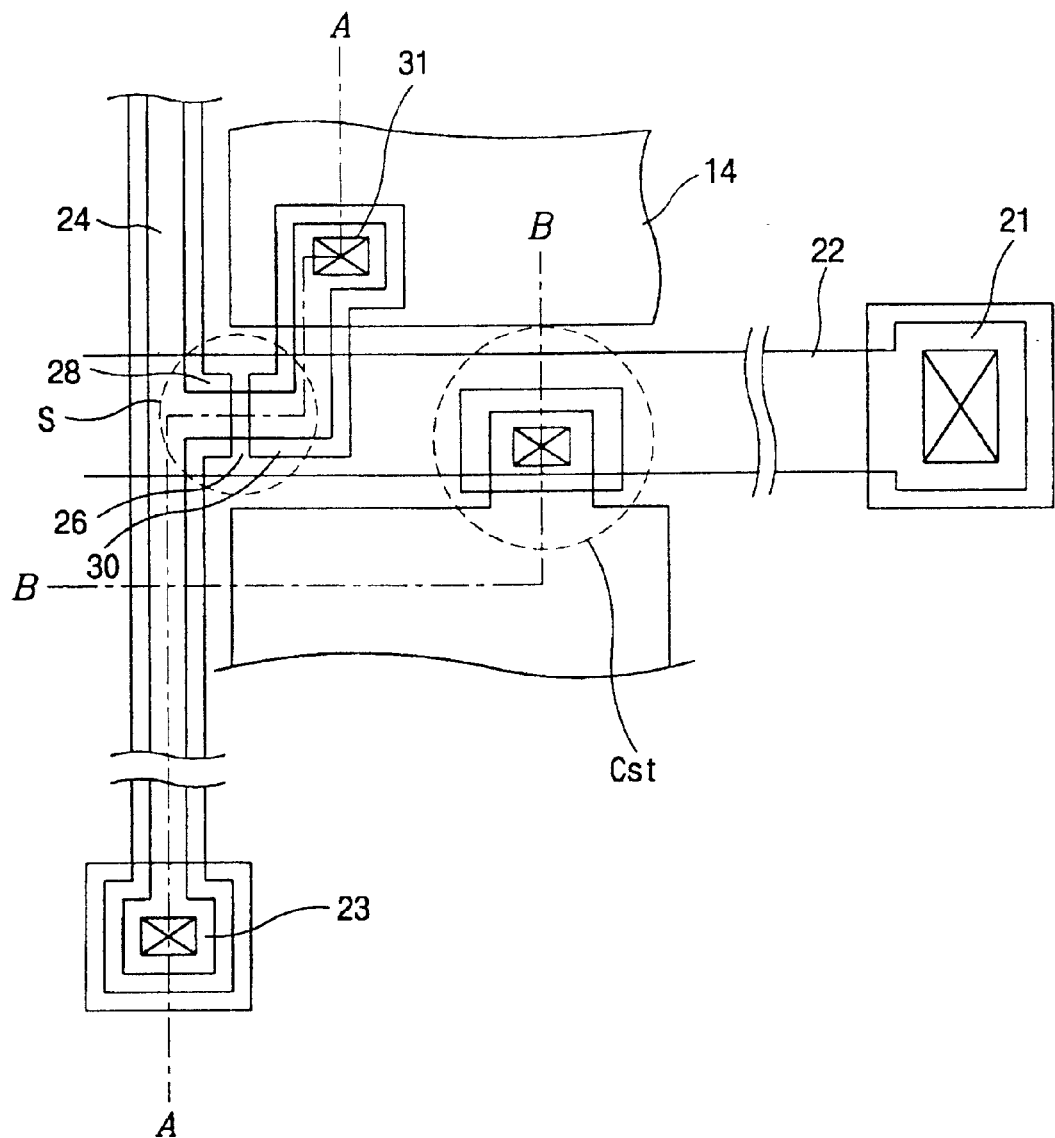
FIG. 1 is a plan view of a conventional LCD device.
Figure 2A:
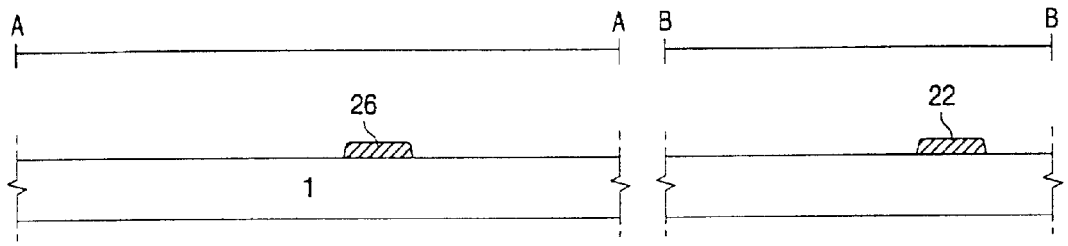
FIGS. 2A to 2E are sectional views taken along lines A—A and B—B of FIG. 1, and illustrate fabrication process steps of an active matrix liquid crystal display device according to the prior art.
Figure 2B:
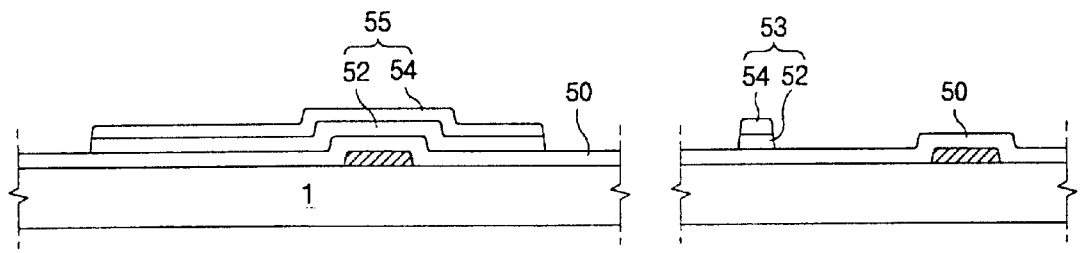
Figure 2C:
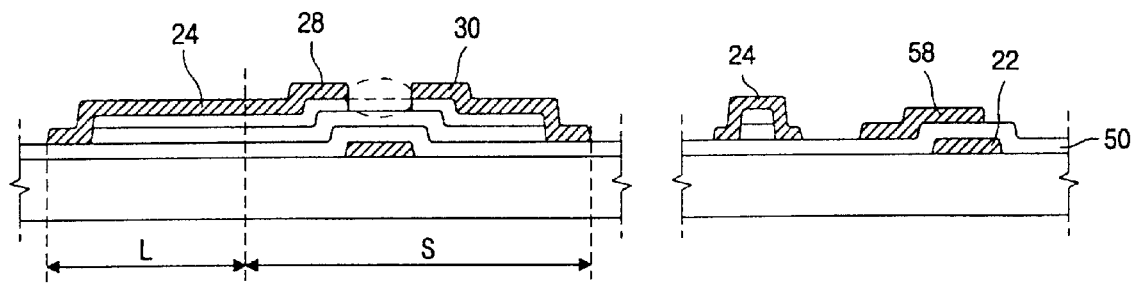
Figure 2D:
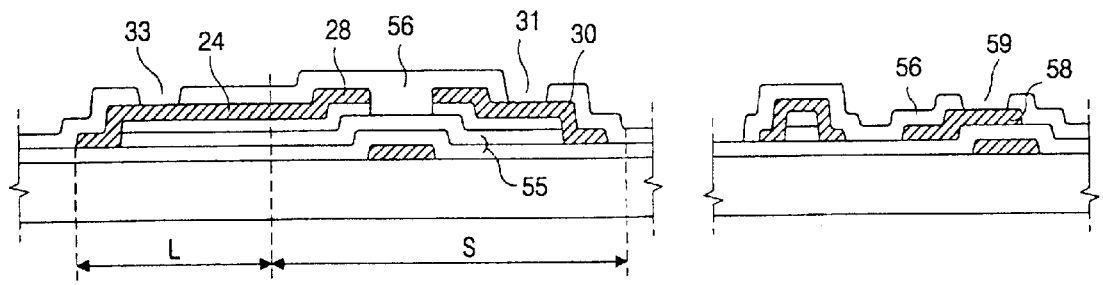
Figure 2E:
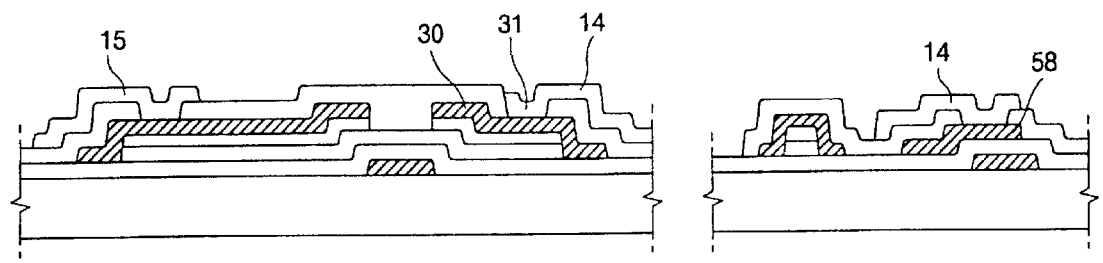
Figure 3:
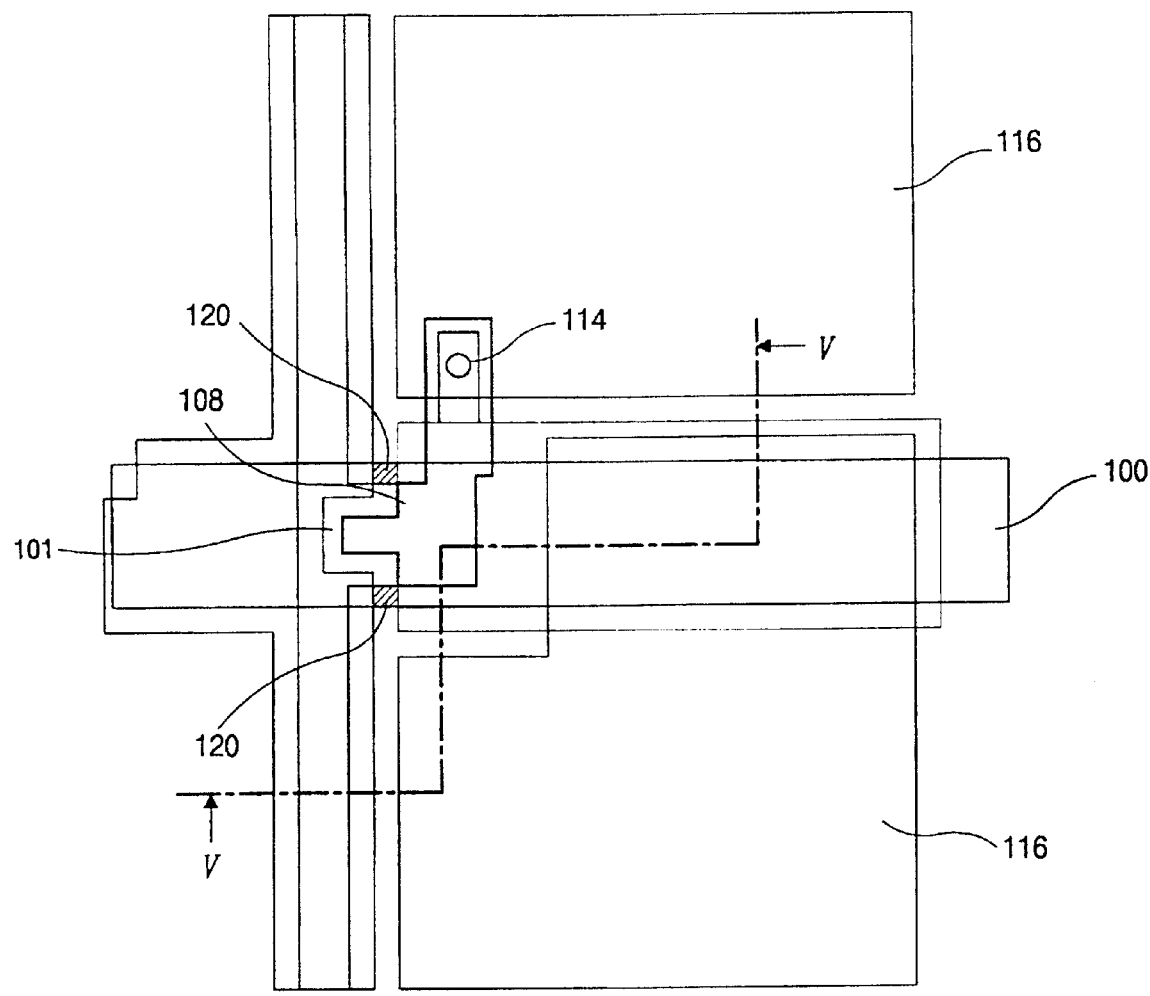
FIG. 3 is a plan view illustrating a liquid crystal display (LCD) device of the invention.

FIG. 3 is a plan view illustrating a liquid crystal display (LCD) device fabricated by a method according to an embodiment of the invention. The fabrication steps will be explained with reference to FIGS. 4A to 4D and FIGS. 5A to 5D, which are plan views and sectional views taken along line V—V of FIG. 3, respectively.

Figure 4A:
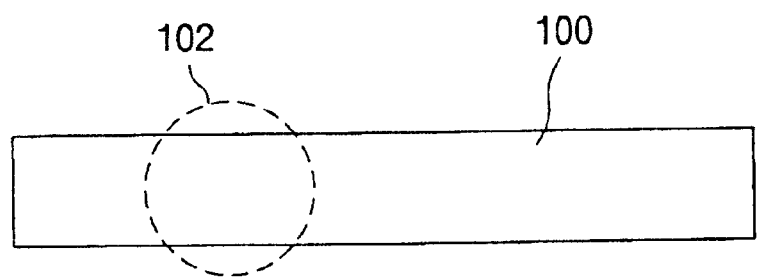
FIGS. 4A to 4D are plan views illustrating fabrication process steps of a liquid crystal display (LCD) device according to an embodiment of the invention.
Figure 5A:
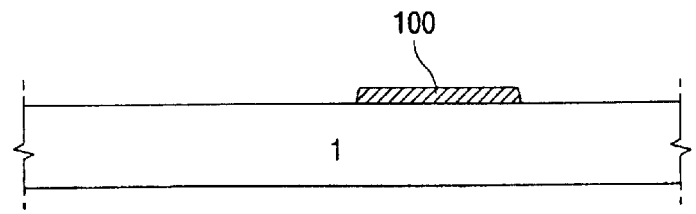
FIGS. 5A to 5D are sectional views illustrating fabrication process steps of a liquid crystal display (LCD) device according to the embodiment of the invention.

First, FIGS. 4A and 5A show a process step to form a gate line on a substrate 1 using a first mask.

A gate line 100 having a gate electrode 102 is formed by depositing and patterning a first metal layer. A metal such as Cr and Mo may be used as the first metal layer, but an aluminum-based alloy metal with dual layered structure of AlNd and Mo is preferred. Though the gate electrode is defined as a portion 102 in the gate line 100, the gate electrode 102 can be formed to protrude from the gate line 100.

Figure 4B:
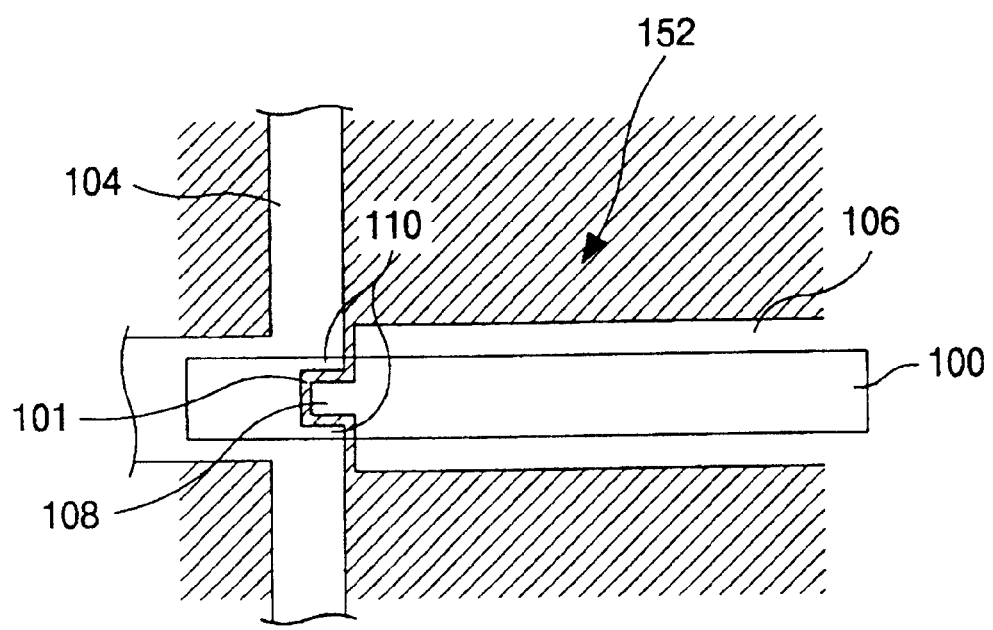
Figure 5B:
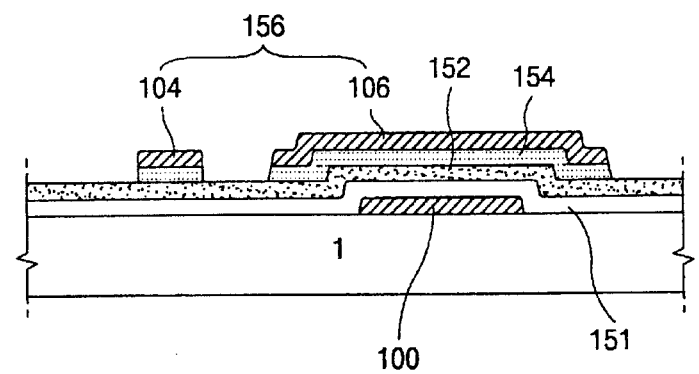

As shown in FIGS. 4B and 5B, an insulating layer 151, a pure amorphous silicon layer 152, a doped amorphous silicon layer 154 and a second metal layer 156 are deposited sequentially on the entire surface of the substrate 1 including the gate line 100. The second metal layer 156 and the doped amorphous silicon layer 154 are patterned using a second mask to form a data line region 104, a gate line protection layer 106, and drain and source electrodes 108 and 110. In this step, an active area or channel 101 of a thin film transistor (TFT) is defined between the drain electrode 108 and the source electrode 110. The gate line protection layer 106 is larger in width than the gate electrode 100, and is used to protect a predetermined portion of the insulating layer 151 which protects the gate electrode 100 from being damaged in a later etching process.

Figure 4C:
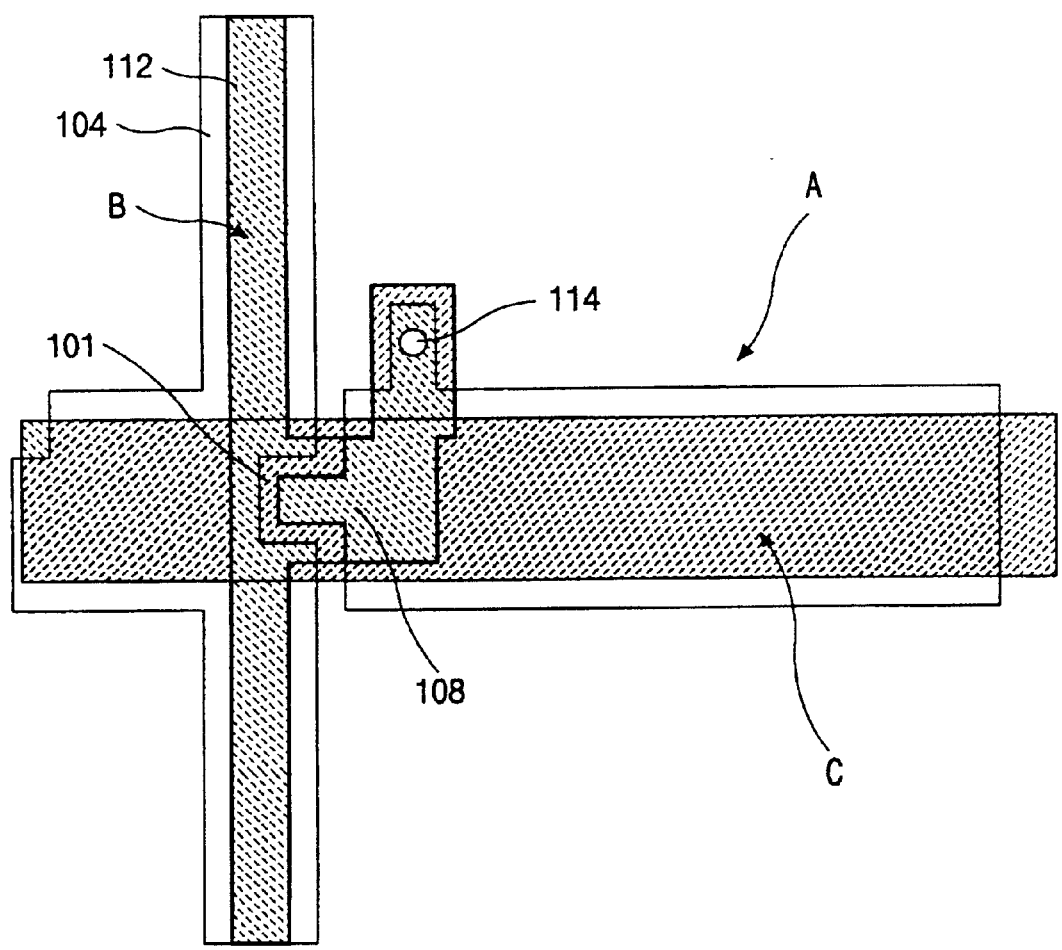
Figure 5C:
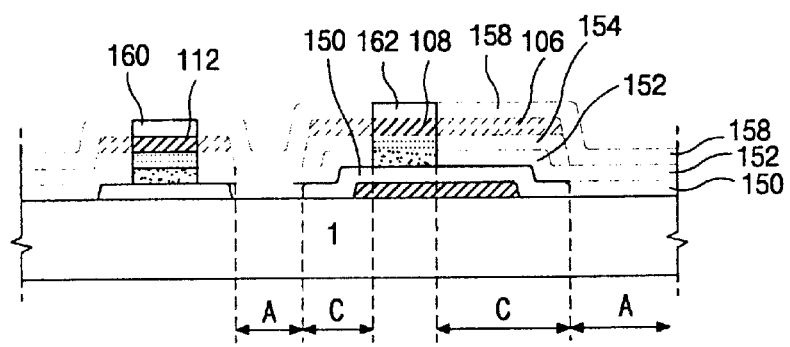

As shown in FIGS. 4C and 5C, a protection layer 158 is deposited on the entire substrate 1 and covers the data line region 104 and the gate line protection layer 106. Then, a third mask process is performed to form protection films 160 and 162, a data line 112 and a gate insulating layer 150, which covers the gate electrode 100. At this point, the etched region after the third mask process can be defined as two regions "A" and "C". The region "A" is etched so that the substrate 1 is exposed, and the region "C" is etched so that the gate insulating layer 150 is exposed. Layers on the two regions "A" and "C" are etched simultaneously. As explained above, the gate insulating layer 150 prevents the gate line 100 from being damaged.

Figure 4D:
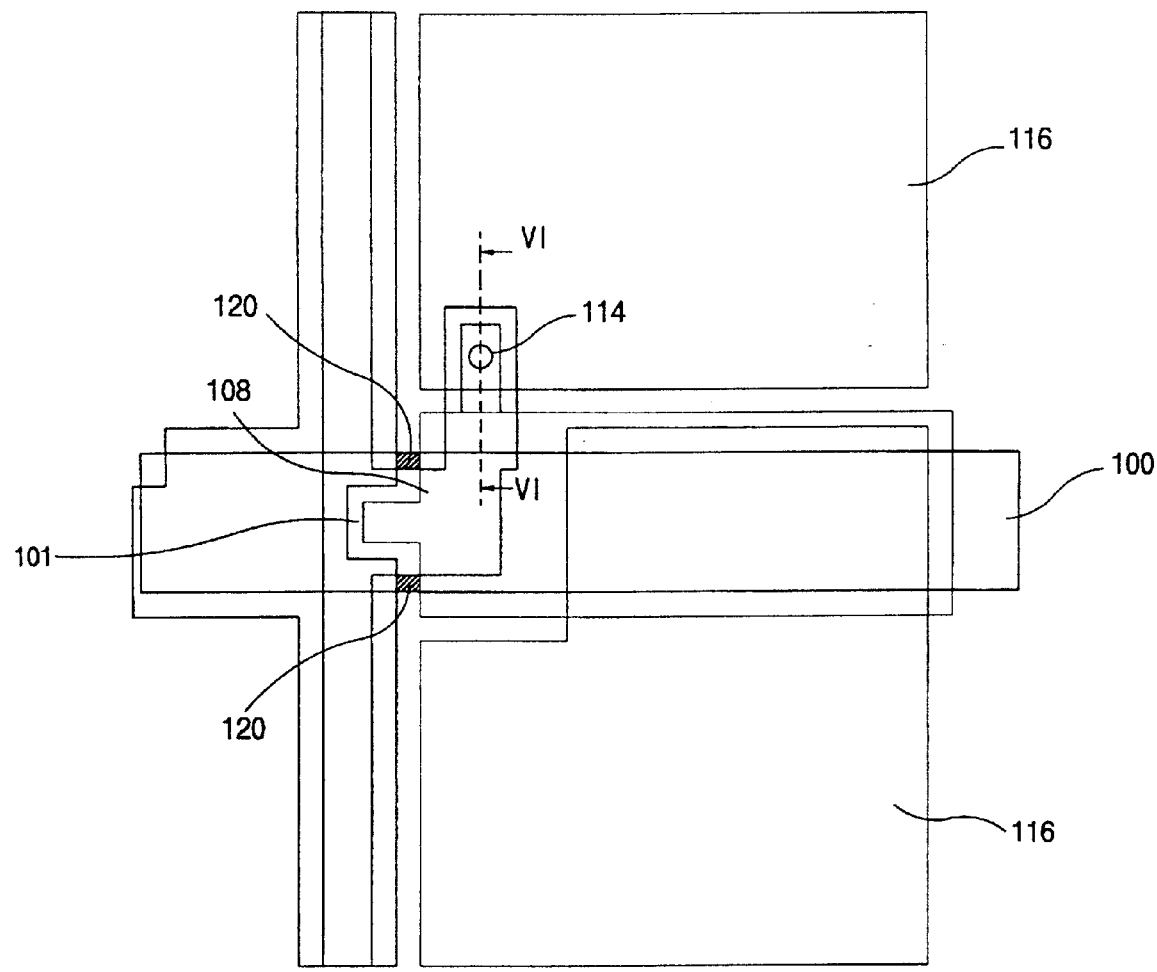
Figure 5D:
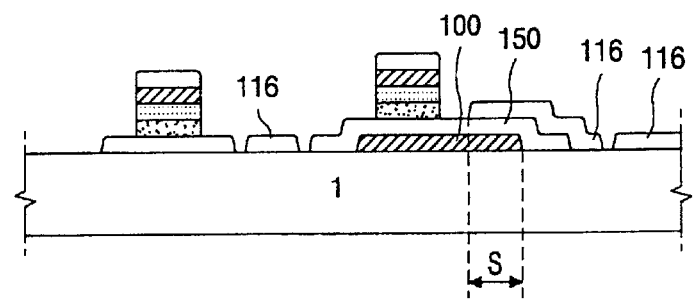

As shown in FIGS. 4D and 5D, a pixel electrode 116 is formed using a fourth mask. A transparent conductive material is employed for the pixel electrode 116. Indium Zinc Oxide (IZO) is preferred due to its good light transmittance characteristics.

To form a storage capacitor "S", the pixel electrode 116 is formed to overlap a portion of the gate line 100. Namely, the gate line 100 serves as a first capacitor electrode, the pixel electrode 116 serves as a second capacitor electrode, and the gate insulating layer 150 between the gate line 100 and the pixel electrode 116 functions as a dielectric layer. Therefore, an overlapping portion of the pixel electrode 116 and the gate line 100 constitute the storage capacitor "S".

Further, a portion 120 of the gate line 100 extending from the active area 101 should be exposed when the pixel electrode 116 is formed with the fourth mask. This prevents a short between the gate electrode 100 and the active area 101 from occurring. At this time, during the fourth mask process, the exposed portion 120 is affected by a developer or developing solution. Thus, if the gate line 100 is made of aluminum-based metal, which has weak resistance to the developer, the exposed portion 120 is preferably etched by a developer after the fourth mask process in order to prevent a short between the exposed portion 120 and the active area 101. But the exposed portion 120 need not be removed if the gate line 100 is made of a chromium-based metal, which has a high corrosion resistance.

Figure 6:
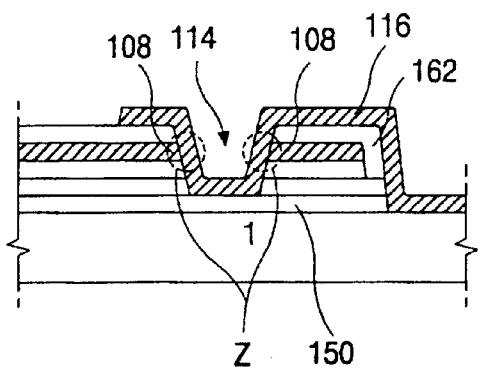
FIG. 6 is a cross sectional view illustrating a connection state between the drain electrode and the pixel electrode according to the embodiment of the invention.

FIG. 6 is a sectional view illustrating a connection between the drain electrode 108 and the pixel electrode 116 along the line VI—VI in FIG. 4D. As shown in FIG. 6, the drain electrode 108 connects with the pixel electrode 116 at a portion "Z" through a contact hole 114, which is formed during the third mask process shown in FIG. 4C. Thus, a length of a contacting surface between the drain electrode 108 and the pixel electrode 116 is determined by the dimensions of the contact hole 114.

Figure 7A:
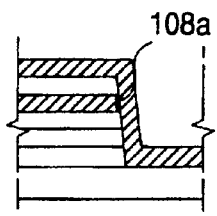
FIG. 7A is a sectional view illustrating another structure of connecting the drain electrode with the pixel electrode.
Figure 7B:
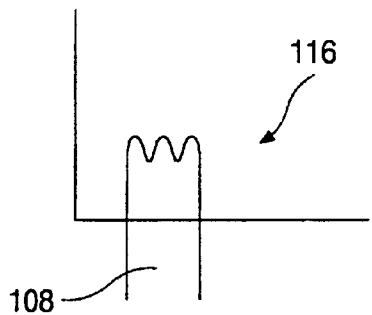
FIG. 7B is a plan view of FIG. 7A.

As shown in FIGS. 7A and 7B, the drain electrode 108 has a sloped end portion 108a, which may be concave or convex and the end portion 108a directly contacts the pixel electrode 116. In this case, the contacting surface between the drain and pixel electrodes 108 and 116 is larger than a width of the drain electrode 108, which in turn lowers contact resistance.

Figure 8:
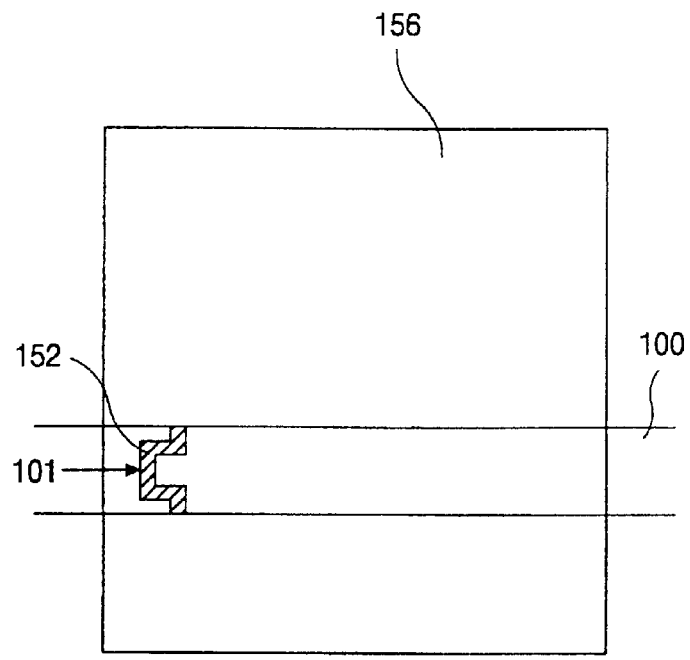
FIG. 8 is a plan view illustrating a modified second mask process step according to the invention.

FIG. 8 shows another method for the second mask process. In FIGS. 4B and 5B, after the second metal layer 156 is deposited on the doped silicon layer 154, portions of the metal layer 156 and the doped silicon layer 154 are etched using the second mask except for the data line region 104 and the gate line protection layer 106. On the other hand, as shown in FIG. 8, during the second mask process only a channel region or active area 101 of the metal layer 156 is etched. In this case, only the active area is formed using a second mask, and the data region 104 and the gate line protection layer 106 are not formed.

Figure 9:
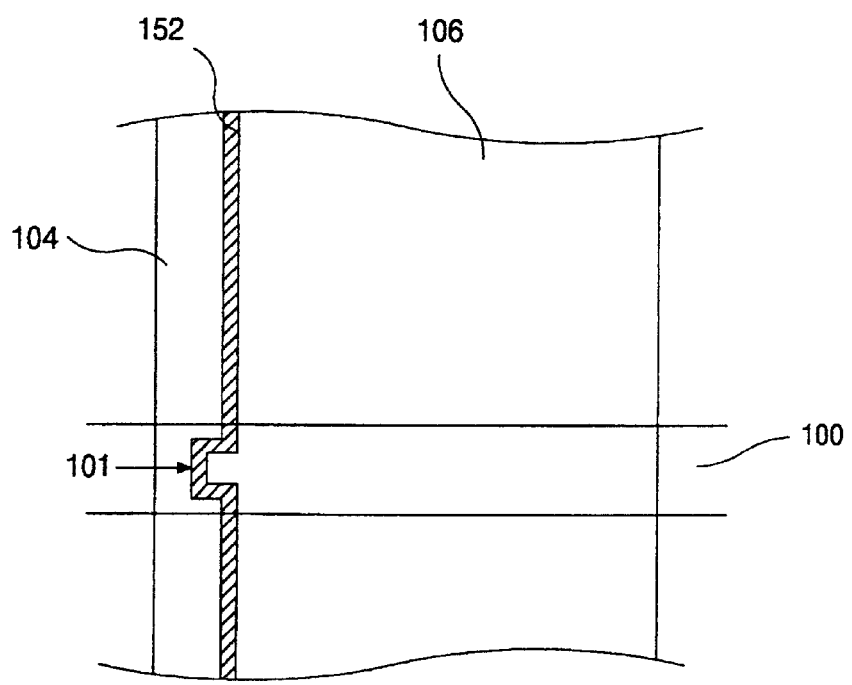
FIG. 9 is a plan view illustrating another modified second mask process step according to the invention.

FIG. 9 shows yet another method for the second mask process of the invention. As shown in FIG. 9, the second metal layer 156 is deposited and patterned to form the data line region 104 and the gate line protection layer 106 spaced apart from the data line region 104. The channel area 101 is also formed during this second mask process.

The third and fourth mask processes shown in FIGS. 5C and 5D are also adapted to fabricate the LCD device for the modified processes as shown in FIGS. 8 and 9.

The embodiments of the invention have the following advantages. The manufacture of the liquid crystal display device is accomplished using fewer mask steps, thus, the fabrication time and the cost are reduced, which leads to high yield with less misalignment.

Since the data line is formed at the same time when the protection layer is patterned, a width of the data line can be controlled.

Further, since the pixel electrode and the gateline act as electrodes of a capacitor, a separate intervening conductive layer (as in the conventional art) is not needed, i.e., can be eliminated.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for fabricating a liquid crystal display array panel, comprising:

forming a gate line by depositing a first metal layer on a substrate and patterning the first metal layer using a first mask;

depositing an insulating layer, a pure amorphous silicon layer, a doped amorphous silicon layer and a second metal layer sequentially on the entire surface of the substrate and covering the gate line;

forming a data line region, a gate line protection layer and an active area by patterning the second metal layer and the doped amorphous silicon layer using a second mask, the data line region having a source electrode and the gate line protection layer having a drain electrode spaced at a predetermined distance from the source electrode;

depositing a protection layer on the entire surface of the substrate while covering the data line region, the gate line protection layer and the active area;

forming a data line, a protection film and a gate insulating layer using a third mask;

depositing a transparent conductive material on the entire surface of the substrate while covering the data line and the source and drain electrodes; and forming a pixel electrode and exposing a portion of the gate line between edges of the data line region and the drain electrode using a fourth mask, the pixel electrode being connected with the drain electrode, the exposed portion extending from the active area.

2. The method according to claim 1, wherein the first metal layer is one of Cr, Mo, and aluminum-based metal.

3. The method according to claim 1, further comprising, a step of removing the exposed portion of the gate line.

4. The method according to claim 1, wherein the transparent conductive material is Indium Zinc Oxide.

5. The method according to claim 1, wherein in the third mask process a contact hole is formed to connect the drain electrode with the pixel electrode.

6. The method according to claim 1, wherein a contact area between the drain electrode and the pixel electrode is larger than a cross section area of the drain electrode.

7. The method according to claim 1, wherein the active area has a "C" shape.

8. A method for fabricating a liquid crystal display device, comprising steps of:

forming a gate line by depositing a first metal layer on a substrate and patterning the first metal layer using a first mask;

depositing an insulating layer, a pure amorphous silicon layer, a doped amorphous silicon layer and a second metal layer sequentially on the entire surface of the substrate and covering the gate line;

forming an active area using a second mask by selectively patterning the second metal layer and the pure amorphous silicon layer, the second metal layer covering the entire surface of the substrate except for the active area;

depositing a protection layer on the entire surface of the substrate and covering the data line region, the gate line protection layer and the active area;

forming a data line, a protection film, a gate insulating layer, and source and drain electrodes by patterning the second metal layer, the pure amorphous metal layer, the doped amorphous silicon layer and the insulating layer using a third mask;

depositing a transparent conductive material on the entire surface while covering the data line and the source and drain electrodes; and forming a pixel electrode and exposing a portion of the gate line between edges of the data line region and the drain electrode using a fourth mask, the pixel electrode being connected with the drain electrode, the exposed portion extending from the active area.

9. The method according to claim 8, wherein the first metal layer is one of Cr, Mo, and aluminum-based metal.

10. The method according to claim 8, further comprising, a step of removing the exposed portion of the gate line.

11. The method according to claim 8, wherein the transparent conductive material is Indium Zinc Oxide.

12. The method according to claim 8, wherein a contact area between the drain electrode and the pixel electrode is larger than a cross section area of the drain electrode.

13. The method according to claim 8, wherein in the third mask process a contact hole is formed to connect the drain electrode with the pixel electrode.

14. The method according to claim 8, wherein the active area has a "C" shape.

15. A method for fabricating a liquid crystal display device, comprising steps of:

forming a gate line by depositing a first metal layer on a substrate and patterning the first metal layer using a first mask;

depositing an insulating layer, a pure amorphous silicon layer, a doped amorphous silicon layer and a second metal layer sequentially on the entire surface of the substrate and covering the gate line;

forming an active area and a data line region using a second mask by selectively patterning the second metal layer and the pure amorphous silicon layer, the second metal layer away from the data line region and covering the entire surface of the substrate excluding the active area and the data line;

depositing a protection layer on the entire surface of the substrate while covering the data line region, the gate line protection layer and the active area;

forming a data line, a protection film, a gate insulating layer, and source and drain electrodes using a third mask by patterning the second metal layer, the pure amorphous metal layer, the doped amorphous silicon layer and the insulating layer;

depositing a transparent conductive material on the entire surface including the data line and the source and drain electrodes; and forming a pixel electrode and exposing a portion of the gate line between edges of the data line region and the drain electrode using a fourth mask, the pixel electrode being connected with the drain electrode, the exposed portion extending from the active area.

16. The method according to claim 15, wherein the first metal layer is one of Cr, Mo, and aluminum-based metal.

17. The method according to claim 16, further comprising, a step of removing the exposed portion of the gate line.

18. The method according to claim 15, wherein the transparent conductive material is Indium Zinc Oxide.

19. The method according to claim 15, wherein in the third mask process is formed a contact hole to connect the drain electrode with the pixel electrode.

20. The method according to claim 15, wherein a contacting area between the drain electrode and the pixel electrode is larger than a cross section area of the drain electrode.

21. The method according to claim 15, wherein the active area has a "C" shape.

* * * * *